US008788070B2

(12) United States Patent
Schumacher et al.

(10) Patent No.: US 8,788,070 B2
(45) Date of Patent: Jul. 22, 2014

(54) AUTOMATIC FIELD DEVICE SERVICE ADVISER

(75) Inventors: Mark S. Schumacher, Minneapolis, MN (US); Evren Eryurek, Melbourne, FL (US)

(73) Assignee: Rosemount Inc., Eden Prairie, MN (US)

( * ) Notice: Subject to any disclaimer, the term of this patent is extended or adjusted under 35 U.S.C. 154(b) by 381 days.

(21) Appl. No.: 11/527,770

(22) Filed: Sep. 26, 2006

(65) Prior Publication Data

US 2008/0125884 A1    May 29, 2008

(51) Int. Cl.
G05B 9/02    (2006.01)
G06F 19/00    (2011.01)
G01C 19/00    (2013.01)

(52) U.S. Cl.
USPC ............. 700/79; 700/108; 700/109; 700/114; 700/115; 700/159; 700/204; 700/104

(58) Field of Classification Search
USPC ........... 700/79, 108, 109, 114, 115, 117, 159, 700/204; 702/104; 714/2; 340/7.44, 7.6; 706/21

See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/151 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 EM |
| 3,948,098 A | 4/1976 | Richardson et al. | 73/861.24 |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,083,031 A | 4/1978 | Pharo, Jr. | 367/135 |
| 4,099,413 A | 7/1978 | Ohte et al. | 73/359 |
| 4,102,199 A | 7/1978 | Talpouras | 73/362 |

(Continued)

FOREIGN PATENT DOCUMENTS

| | | |
|---|---|---|
| CA | 999950 | 11/1976 |
| CN | 1346435 | 4/2002 |

(Continued)

OTHER PUBLICATIONS

Emerson Proves Advancements in EDDL (Electronic Device Description Language) Technology, Apr. 2005, Emerson Process Management News, abstract.*

(Continued)

*Primary Examiner* — Kavita Padmanabhan
*Assistant Examiner* — Thomas Stevens
(74) *Attorney, Agent, or Firm* — Westman, Champlin & Koehler, P.A.

(57) ABSTRACT

A field device resident algorithm receives one or more diagnostic inputs and generates actionable service information. The algorithm(s) can be changed or updated after the manufacture of the field device. The actionable service information can be displayed locally or sent over a process control loop. A prediction engine can be employed to determine a period within which such service should be completed.

25 Claims, 5 Drawing Sheets

(56) References Cited

U.S. PATENT DOCUMENTS

| | | | | |
|---|---|---|---|---|
| 4,122,719 A | 10/1978 | Carlson et al. ............... 73/342 |
| 4,249,164 A | 2/1981 | Tivy ............... 340/870.3 |
| 4,250,490 A | 2/1981 | Dahlke ............... 340/870.37 |
| 4,255,964 A | 3/1981 | Morison ............... 73/24.01 |
| 4,279,013 A | 7/1981 | Cameron et al. ............... 340/870.37 |
| 4,337,516 A | 6/1982 | Murphy et al. ............... 364/551 |
| 4,383,443 A | 5/1983 | Langdon ............... 73/290 |
| 4,390,321 A | 6/1983 | Langlois et al. ............... 417/15 |
| 4,399,824 A | 8/1983 | Davidson ............... 128/736 |
| 4,417,312 A | 11/1983 | Cronin et al. ............... 364/510 |
| 4,423,634 A | 1/1984 | Audenard et al. ............... 73/587 |
| 4,446,741 A | 5/1984 | Sirokorad et al. ............... 73/654 |
| 4,459,858 A | 7/1984 | Marsh ............... 73/861.12 |
| 4,463,612 A | 8/1984 | Thompson ............... 73/861.22 |
| 4,517,468 A | 5/1985 | Kemper et al. ............... 290/52 |
| 4,530,234 A | 7/1985 | Cullick et al. ............... 73/53 |
| 4,536,753 A | 8/1985 | Parker ............... 340/566 |
| 4,540,468 A | 9/1985 | Genco et al. ............... 162/49 |
| 4,571,689 A | 2/1986 | Hildebrand et al. ............... 364/481 |
| 4,630,265 A | 12/1986 | Sexton ............... 370/85 |
| 4,635,214 A | 1/1987 | Kasai et al. ............... 364/551 |
| 4,642,782 A | 2/1987 | Kemper et al. ............... 364/550 |
| 4,644,479 A | 2/1987 | Kemper et al. ............... 364/550 |
| 4,649,515 A | 3/1987 | Thompson et al. ............... 364/900 |
| 4,668,473 A | 5/1987 | Agarwal ............... 422/62 |
| 4,686,638 A | 8/1987 | Furuse ............... 364/558 |
| 4,696,191 A | 9/1987 | Claytor et al. ............... 73/600 |
| 4,705,212 A | 11/1987 | Miller et al. ............... 236/54 |
| 4,707,796 A | 11/1987 | Calabro et al. ............... 364/552 |
| 4,720,806 A | 1/1988 | Schippers et al. ............... 364/551 |
| 4,736,367 A | 4/1988 | Wroblewski et al. ............... 370/85 |
| 4,736,763 A | 4/1988 | Britton et al. ............... 137/10 |
| 4,758,308 A | 7/1988 | Carr ............... 162/263 |
| 4,777,585 A | 10/1988 | Kokawa et al. ............... 364/164 |
| 4,818,994 A | 4/1989 | Orth et al. ............... 340/501 |
| 4,831,564 A | 5/1989 | Suga ............... 364/551.01 |
| 4,833,922 A | 5/1989 | Frick et al. ............... 73/756 |
| 4,841,286 A | 6/1989 | Kummer ............... 340/653 |
| 4,853,693 A | 8/1989 | Eaton-Williams ............... 340/588 |
| 4,866,628 A | 9/1989 | Natarajan ............... 700/102 |
| 4,873,655 A | 10/1989 | Kondraske ............... 364/553 |
| 4,907,167 A | 3/1990 | Skeirik ............... 364/500 |
| 4,924,418 A | 5/1990 | Bachman et al. ............... 364/550 |
| 4,926,364 A | 5/1990 | Brotherton ............... 364/581 |
| 4,934,196 A | 6/1990 | Romano ............... 73/861.38 |
| 4,939,753 A | 7/1990 | Olson ............... 375/107 |
| 4,964,125 A | 10/1990 | Kim ............... 371/15.1 |
| 4,988,990 A | 1/1991 | Warrior ............... 340/25.5 |
| 4,992,965 A | 2/1991 | Holter et al. ............... 364/551.01 |
| 5,005,142 A | 4/1991 | Lipchak et al. ............... 364/550 |
| 5,025,344 A | 6/1991 | Maly et al. ............... 361/88 |
| 5,043,862 A | 8/1991 | Takahashi et al. ............... 364/162 |
| 5,047,990 A | 9/1991 | Gafos et al. ............... 367/6 |
| 5,053,815 A | 10/1991 | Wendell ............... 355/208 |
| 5,057,774 A | 10/1991 | Verhelst et al. ............... 324/537 |
| 5,067,099 A | 11/1991 | McCown et al. ............... 364/550 |
| 5,081,598 A | 1/1992 | Bellows et al. ............... 364/550 |
| 5,089,979 A | 2/1992 | McEachern et al. ............... 364/571.04 |
| 5,089,984 A | 2/1992 | Struger et al. ............... 395/650 |
| 5,094,109 A | 3/1992 | Dean et al. ............... 73/718 |
| 5,098,197 A | 3/1992 | Shepard et al. ............... 374/120 |
| 5,099,436 A | 3/1992 | McCown et al. ............... 364/550 |
| 5,103,409 A | 4/1992 | Shimizu et al. ............... 364/556 |
| 5,111,531 A | 5/1992 | Grayson et al. ............... 395/23 |
| 5,121,467 A | 6/1992 | Skeirik ............... 395/11 |
| 5,122,794 A | 6/1992 | Warrior ............... 340/825.2 |
| 5,122,976 A | 6/1992 | Bellows et al. ............... 364/550 |
| 5,130,936 A | 7/1992 | Sheppard et al. ............... 364/551.01 |
| 5,134,574 A | 7/1992 | Beaverstock et al. ............... 364/551.01 |
| 5,137,370 A | 8/1992 | McCullock et al. ............... 374/173 |
| 5,142,612 A | 8/1992 | Skeirik ............... 395/11 |
| 5,143,452 A | 9/1992 | Maxedon et al. ............... 374/170 |
| 5,148,378 A | 9/1992 | Shibayama et al. ............... 364/551.07 |
| 5,150,289 A | 9/1992 | Badavas ............... 364/154 |
| 5,167,009 A | 11/1992 | Skeirik ............... 395/27 |
| 5,175,678 A | 12/1992 | Frerichs et al. ............... 364/148 |
| 5,189,624 A * | 2/1993 | Barlow et al. ............... 700/169 |
| 5,193,143 A | 3/1993 | Kaemmerer et al. ............... 395/51 |
| 5,197,114 A | 3/1993 | Skeirik ............... 395/22 |
| 5,197,328 A | 3/1993 | Fitzgerald ............... 73/168 |
| 5,212,765 A | 5/1993 | Skeirik ............... 395/11 |
| 5,214,582 A | 5/1993 | Gray ............... 364/424.03 |
| 5,216,226 A | 6/1993 | Miyoshi ............... 219/497 |
| 5,216,612 A * | 6/1993 | Cornett et al. ............... 700/96 |
| 5,224,203 A | 6/1993 | Skeirik ............... 395/22 |
| 5,228,780 A | 7/1993 | Shepard et al. ............... 374/175 |
| 5,235,527 A | 8/1993 | Ogawa et al. ............... 364/571.05 |
| 5,265,031 A | 11/1993 | Malczewski ............... 364/497 |
| 5,265,222 A | 11/1993 | Nishiya et al. ............... 395/3 |
| 5,267,241 A * | 11/1993 | Kowal ............... 714/706 |
| 5,269,311 A | 12/1993 | Kirchner et al. ............... 128/672 |
| 5,274,572 A | 12/1993 | O'Neill et al. ............... 364/550 |
| 5,282,131 A | 1/1994 | Rudd et al. ............... 364/164 |
| 5,282,261 A | 1/1994 | Skeirik ............... 395/22 |
| 5,293,585 A | 3/1994 | Morita ............... 395/52 |
| 5,303,181 A | 4/1994 | Stockton ............... 365/96 |
| 5,305,230 A | 4/1994 | Matsumoto et al. ............... 364/495 |
| 5,311,421 A | 5/1994 | Nomura et al. ............... 364/157 |
| 5,317,520 A | 5/1994 | Castle ............... 364/482 |
| 5,327,357 A | 7/1994 | Feinstein et al. ............... 364/502 |
| 5,333,240 A * | 7/1994 | Matsumoto et al. ............... 706/20 |
| 5,340,271 A | 8/1994 | Freeman et al. ............... 415/1 |
| 5,347,843 A | 9/1994 | Orr et al. ............... 73/3 |
| 5,349,541 A | 9/1994 | Alexandro, Jr. et al. ............... 364/578 |
| 5,351,199 A * | 9/1994 | Ticconi et al. ............... 700/282 |
| 5,357,449 A | 10/1994 | Oh ............... 364/551.01 |
| 5,361,628 A | 11/1994 | Marko et al. ............... 73/116 |
| 5,365,423 A | 11/1994 | Chand ............... 364/140 |
| 5,365,787 A | 11/1994 | Hernandez et al. ............... 73/660 |
| 5,367,612 A | 11/1994 | Bozich et al. ............... 395/22 |
| 5,369,674 A | 11/1994 | Yokose et al. ............... 376/245 |
| 5,384,699 A | 1/1995 | Levy et al. ............... 364/413.13 |
| 5,386,373 A | 1/1995 | Keeler et al. ............... 364/577 |
| 5,388,465 A | 2/1995 | Okaniwa et al. ............... 73/861.17 |
| 5,392,293 A | 2/1995 | Hsue ............... 324/765 |
| 5,394,341 A | 2/1995 | Kepner ............... 364/551.01 |
| 5,394,543 A | 2/1995 | Hill et al. ............... 395/575 |
| 5,404,064 A | 4/1995 | Mermelstein et al. ............... 310/319 |
| 5,408,406 A | 4/1995 | Mathur et al. ............... 364/163 |
| 5,408,586 A | 4/1995 | Skeirik ............... 395/23 |
| 5,410,495 A | 4/1995 | Ramamurthi ............... 364/511.05 |
| 5,414,645 A | 5/1995 | Hirano ............... 364/551.01 |
| 5,419,197 A | 5/1995 | Ogi et al. ............... 73/659 |
| 5,430,642 A | 7/1995 | Nakajima et al. ............... 364/148 |
| 5,434,774 A | 7/1995 | Seberger ............... 364/172 |
| 5,436,705 A | 7/1995 | Raj ............... 355/246 |
| 5,440,478 A | 8/1995 | Fisher et al. ............... 364/188 |
| 5,442,639 A | 8/1995 | Crowder et al. ............... 371/20.1 |
| 5,444,820 A * | 8/1995 | Tzes et al. ............... 706/21 |
| 5,467,355 A | 11/1995 | Umeda et al. ............... 364/571.04 |
| 5,469,070 A | 11/1995 | Koluvek ............... 324/713 |
| 5,469,156 A | 11/1995 | Kogure ............... 340/870.38 |
| 5,469,735 A | 11/1995 | Watanabe ............... 73/118.1 |
| 5,469,749 A | 11/1995 | Shimada et al. ............... 73/861.47 |
| 5,481,199 A | 1/1996 | Anderson et al. ............... 324/705 |
| 5,481,200 A | 1/1996 | Voegele et al. ............... 324/718 |
| 5,483,387 A | 1/1996 | Bauhahn et al. ............... 359/885 |
| 5,485,753 A | 1/1996 | Burns et al. ............... 73/720 |
| 5,486,996 A | 1/1996 | Samad et al. ............... 364/152 |
| 5,488,697 A | 1/1996 | Kaemmerer et al. ............... 395/51 |
| 5,489,831 A | 2/1996 | Harris ............... 318/701 |
| 5,495,769 A | 3/1996 | Broden et al. ............... 73/718 |
| 5,510,779 A | 4/1996 | Maltby et al. ............... 340/870.3 |
| 5,511,004 A | 4/1996 | Dubost et al. ............... 364/551.01 |
| 5,526,293 A | 6/1996 | Mozumder et al. ............... 364/578 |
| 5,539,638 A | 7/1996 | Keeler et al. ............... 364/424.03 |
| 5,548,528 A | 8/1996 | Keeler et al. ............... 364/497 |
| 5,549,137 A * | 8/1996 | Lenz et al. ............... 137/486 |
| 5,555,190 A | 9/1996 | Derby et al. ............... 364/510 |
| 5,560,246 A | 10/1996 | Bottinger et al. ............... 73/861.15 |
| 5,561,599 A | 10/1996 | Lu ............... 364/164 |
| 5,570,034 A | 10/1996 | Needham et al. ............... 324/763 |
| 5,570,300 A | 10/1996 | Henry et al. ............... 364/551.01 |
| 5,572,420 A | 11/1996 | Lu ............... 364/153 |

(56) References Cited

U.S. PATENT DOCUMENTS

| | | | | |
|---|---|---|---|---|
| 5,572,438 A * | 11/1996 | Ehlers et al. ............... 700/295 |
| 5,573,032 A | 11/1996 | Lenz et al. ................... 137/486 |
| 5,578,763 A | 11/1996 | Spencer et al. ............ 73/861.08 |
| 5,591,922 A | 1/1997 | Segeral et al. ............. 73/861.04 |
| 5,598,521 A | 1/1997 | Kilgore et al. ................ 395/326 |
| 5,600,148 A | 2/1997 | Cole et al. .................. 250/495.1 |
| 5,600,791 A * | 2/1997 | Carlson et al. .............. 714/47.3 |
| 5,608,650 A | 3/1997 | McClendon et al. .......... 364/510 |
| 5,623,605 A | 4/1997 | Keshav et al. ............ 395/200.17 |
| 5,629,870 A | 5/1997 | Farag et al. ............... 364/551.01 |
| 5,633,809 A | 5/1997 | Wissenbach et al. ......... 364/510 |
| 5,637,802 A | 6/1997 | Frick et al. ...................... 73/724 |
| 5,640,491 A | 6/1997 | Bhat et al. ........................ 395/22 |
| 5,644,240 A | 7/1997 | Brugger ......................... 324/439 |
| 5,650,943 A | 7/1997 | Powell et al. .................... 702/51 |
| 5,654,869 A | 8/1997 | Ohi et al. ....................... 361/540 |
| 5,661,668 A | 8/1997 | Yemini et al. ................. 364/550 |
| 5,665,899 A | 9/1997 | Willcox .............................. 73/4 |
| 5,668,322 A | 9/1997 | Broden .......................... 73/756 |
| 5,671,335 A | 9/1997 | Davis et al. ..................... 395/23 |
| 5,672,247 A | 9/1997 | Pangalos et al. ................ 162/65 |
| 5,675,504 A | 10/1997 | Serodes et al. ................ 364/496 |
| 5,675,724 A | 10/1997 | Beal et al. ................. 395/182.02 |
| 5,680,109 A | 10/1997 | Lowe et al. .................... 340/608 |
| 5,682,317 A | 10/1997 | Keeler et al. .............. 364/431.03 |
| 5,682,476 A | 10/1997 | Tapperson et al. ............ 370/225 |
| 5,704,011 A | 12/1997 | Hansen et al. ................... 395/22 |
| 5,705,754 A | 1/1998 | Keita et al. ................. 73/861.357 |
| 5,705,978 A | 1/1998 | Frick et al. .................... 340/511 |
| 5,708,211 A | 1/1998 | Jepson et al. ............... 73/861.04 |
| 5,708,585 A | 1/1998 | Kushion ................... 364/431.061 |
| 5,710,370 A | 1/1998 | Shanahan et al. ............. 73/1.35 |
| 5,713,668 A | 2/1998 | Lunghofer et al. ............ 374/179 |
| 5,731,522 A | 3/1998 | Sittler ............................. 73/708 |
| 5,736,649 A | 4/1998 | Kawasaki et al. .......... 73/861.23 |
| 5,742,845 A | 4/1998 | Wagner .......................... 395/834 |
| 5,746,511 A | 5/1998 | Eryurek et al. ................... 374/2 |
| 5,747,701 A | 5/1998 | Marsh et al. ............... 73/861.23 |
| 5,748,883 A * | 5/1998 | Carlson et al. .............. 714/47.3 |
| 5,752,008 A | 5/1998 | Bowling ......................... 395/500 |
| 5,754,451 A * | 5/1998 | Williams ........................ 702/185 |
| 5,764,539 A | 6/1998 | Rani .............................. 364/557 |
| 5,764,891 A * | 6/1998 | Warrior ........................... 710/72 |
| 5,781,024 A | 7/1998 | Blomberg et al. ............. 324/763 |
| 5,781,878 A | 7/1998 | Mizoguchi et al. ............ 701/109 |
| 5,790,413 A | 8/1998 | Bartusiak et al. .............. 364/485 |
| 5,796,006 A | 8/1998 | Bellet et al. ..................... 73/661 |
| 5,801,689 A | 9/1998 | Huntsman ...................... 345/329 |
| 5,805,442 A | 9/1998 | Crater et al. .................. 364/138 |
| 5,817,950 A | 10/1998 | Wiklund et al. ............ 73/861.66 |
| 5,825,664 A | 10/1998 | Warrior et al. .................. 700/7 |
| 5,828,567 A | 10/1998 | Eryurek ......................... 364/184 |
| 5,854,993 A | 12/1998 | Crichnik ......................... 702/54 |
| 5,854,994 A | 12/1998 | Canada et al. ................... 702/56 |
| 5,859,964 A | 1/1999 | Wang et al. .............. 395/185.01 |
| 5,869,772 A | 2/1999 | Storer ........................ 73/861.24 |
| 5,887,978 A | 3/1999 | Lunghofer et al. ............ 374/179 |
| 5,900,801 A * | 5/1999 | Heagle et al. ............. 340/286.09 |
| 5,908,990 A | 6/1999 | Cummings ................. 73/861.22 |
| 5,920,016 A | 7/1999 | Broden .......................... 73/756 |
| 5,923,557 A | 7/1999 | Eidson ...................... 364/471.03 |
| 5,924,086 A | 7/1999 | Mathur et al. .................. 706/25 |
| 5,934,371 A | 8/1999 | Bussear et al. ................. 166/53 |
| 5,936,514 A | 8/1999 | Anderson et al. ......... 340/310.01 |
| 5,940,013 A * | 8/1999 | Vladimir et al. ............... 340/945 |
| 5,940,290 A | 8/1999 | Dixon ........................... 364/138 |
| 5,956,663 A | 9/1999 | Eryurek ......................... 702/183 |
| 5,970,430 A | 10/1999 | Burns et al. ................... 702/122 |
| 5,995,910 A | 11/1999 | Discenzo ........................ 702/56 |
| 6,002,952 A | 12/1999 | Diab et al. ..................... 600/310 |
| 6,006,338 A | 12/1999 | Longsdorf et al. ............ 713/340 |
| 6,014,612 A | 1/2000 | Larson et al. .................. 702/183 |
| 6,016,706 A | 1/2000 | Yamamoto et al. ................ 9/6 |
| 6,017,143 A | 1/2000 | Eryurek .......................... 700/51 |
| 6,023,399 A | 2/2000 | Kogure ........................... 361/23 |
| 6,026,352 A | 2/2000 | Burns et al. ................... 702/182 |
| 6,046,642 A | 4/2000 | Brayton et al. ................. 330/296 |
| 6,047,220 A | 4/2000 | Eryurek .......................... 700/28 |
| 6,047,222 A | 4/2000 | Burns et al. ..................... 700/79 |
| 6,059,254 A | 5/2000 | Sundet et al. .................. 248/678 |
| 6,061,603 A | 5/2000 | Papadopoulos et al. ........ 700/83 |
| 6,072,150 A | 6/2000 | Sheffer ...................... 219/121.83 |
| 6,094,600 A | 7/2000 | Sharpe, Jr. et al. ............. 700/19 |
| 6,104,875 A * | 8/2000 | Gallagher et al. ............. 717/168 |
| 6,112,131 A | 8/2000 | Ghorashi et al. .............. 700/142 |
| 6,119,047 A | 9/2000 | Eryurek .......................... 700/28 |
| 6,139,180 A | 10/2000 | Usher et al. ..................... 374/1 |
| 6,179,964 B1 | 1/2001 | Begemann et al. ........... 162/198 |
| 6,182,501 B1 | 2/2001 | Furuse et al. ................... 73/49.2 |
| 6,199,018 B1 | 3/2001 | Quist et al. ...................... 702/34 |
| 6,209,048 B1 | 3/2001 | Wolff .............................. 710/62 |
| 6,237,424 B1 | 5/2001 | Salmasi et al. ............. 73/861.17 |
| 6,260,004 B1 | 7/2001 | Hays et al. ..................... 702/183 |
| 6,272,438 B1 | 8/2001 | Cunningham et al. .......... 702/56 |
| 6,289,735 B1 | 9/2001 | Dister et al. ..................... 73/579 |
| 6,298,454 B1 * | 10/2001 | Schleiss et al. .................. 714/37 |
| 6,307,483 B1 | 10/2001 | Westfield et al. ......... 340/870.11 |
| 6,317,701 B1 | 11/2001 | Pyostsia et al. ............... 702/188 |
| 6,330,005 B1 * | 12/2001 | Tonelli et al. .................. 715/735 |
| 6,347,252 B1 | 2/2002 | Behr et al. ......................... 700/2 |
| 6,356,191 B1 | 3/2002 | Kirkpatrick .................... 340/501 |
| 6,360,277 B1 | 3/2002 | Ruckley et al. .................. 9/250 |
| 6,370,448 B1 | 4/2002 | Eryurek et al. ............... 700/282 |
| 6,377,859 B1 | 4/2002 | Brown et al. .................... 700/79 |
| 6,378,364 B1 | 4/2002 | Pelletier et al. ............. 73/152.47 |
| 6,396,426 B1 | 5/2002 | Balard et al. .................. 341/120 |
| 6,397,114 B1 | 5/2002 | Eryurek ................... 364/999.999 |
| 6,405,099 B1 | 6/2002 | Nagai et al. .................... 700/159 |
| 6,425,038 B1 | 7/2002 | Sprecher ........................ 710/269 |
| 6,434,504 B1 | 8/2002 | Eryurek ......................... 702/130 |
| 6,447,459 B1 * | 9/2002 | Larom ........................... 600/538 |
| 6,449,574 B1 | 9/2002 | Eryurek ........................... 702/99 |
| 6,473,656 B1 | 10/2002 | Langels et al. .................. 700/17 |
| 6,473,710 B1 | 10/2002 | Eryurek ......................... 702/133 |
| 6,480,793 B1 | 11/2002 | Martin ............................ 702/45 |
| 6,492,921 B1 | 12/2002 | Kunitani et al. ............... 341/118 |
| 6,493,689 B2 | 12/2002 | Kotoulas et al. ................. 706/23 |
| 6,496,814 B1 * | 12/2002 | Busche .......................... 706/21 |
| 6,497,222 B2 | 12/2002 | Bolz et al. ..................... 123/476 |
| 6,505,517 B1 | 1/2003 | Eryurek ..................... 73/861.08 |
| 6,519,546 B1 | 2/2003 | Eryurek ......................... 702/130 |
| 6,530,259 B1 | 3/2003 | Kelly et al. .................... 73/23.2 |
| 6,532,392 B1 | 3/2003 | Eryurek .......................... 700/32 |
| 6,539,267 B1 | 3/2003 | Eryurek .......................... 700/51 |
| 6,546,814 B1 | 4/2003 | Choe et al. ................. 73/862.08 |
| 6,556,145 B1 * | 4/2003 | Kirkpatrick et al. ...... 340/870.17 |
| 6,561,038 B2 | 5/2003 | Gravel et al. ................. 73/729.2 |
| 6,564,268 B1 | 5/2003 | Davis et al. ..................... 710/11 |
| 6,567,006 B1 | 5/2003 | Lander et al. .................. 340/605 |
| 6,594,603 B1 * | 7/2003 | Eryurek et al. ................ 702/104 |
| 6,597,997 B2 | 7/2003 | Tingley .......................... 702/34 |
| 6,601,005 B1 * | 7/2003 | Eryurek et al. ................ 702/104 |
| 6,611,775 B1 | 8/2003 | Coursolle ........................ 702/65 |
| 6,615,149 B1 | 9/2003 | Wehrs ............................ 702/76 |
| 6,629,059 B2 | 9/2003 | Borgeson ...................... 702/183 |
| 6,633,782 B1 * | 10/2003 | Schleiss et al. ................. 700/26 |
| 6,637,267 B2 | 10/2003 | Fiebelkorn et al. .............. 73/587 |
| 6,654,697 B1 | 11/2003 | Eryurek ......................... 702/183 |
| 6,662,120 B2 | 12/2003 | Drahm et al. ............. 73/861.355 |
| 6,701,274 B1 | 3/2004 | Eryurek ......................... 702/140 |
| 6,722,185 B2 | 4/2004 | Lawson et al. ................... 73/40 |
| 6,727,812 B2 | 4/2004 | Sauler et al. ................... 340/511 |
| 6,735,549 B2 * | 5/2004 | Ridolfo ......................... 702/181 |
| 6,738,388 B1 | 5/2004 | Stevenson et al. ............. 370/465 |
| 6,751,560 B1 | 6/2004 | Tingley et al. .................. 702/51 |
| 6,754,601 B1 * | 6/2004 | Eryurek et al. ................ 702/104 |
| 6,758,168 B2 | 7/2004 | Koskinen et al. ................ 122/7 |
| 6,772,036 B2 | 8/2004 | Eryurek ......................... 700/127 |
| 6,785,592 B1 * | 8/2004 | Smith et al. ................... 700/291 |
| 6,859,755 B2 | 2/2005 | Eryurek et al. ............... 702/183 |
| 6,889,166 B2 | 5/2005 | Zielinski ....................... 702/183 |
| 6,892,317 B1 * | 5/2005 | Sampath et al. ............... 714/4.3 |
| 6,904,476 B2 | 6/2005 | Hedtke .......................... 710/72 |
| 6,907,383 B2 | 6/2005 | Eryurek ......................... 702/183 |

(56) References Cited

U.S. PATENT DOCUMENTS

| | | | |
|---|---|---|---|
| 6,915,364 B1 | 7/2005 | Christensen et al. | 710/104 |
| 6,970,003 B2 | 11/2005 | Rome et al. | 324/718 |
| 6,976,503 B2 | 12/2005 | Ens et al. | 137/552 |
| 7,013,185 B2* | 3/2006 | Simon | 700/10 |
| 7,018,800 B2* | 3/2006 | Huisenga et al. | 435/6 |
| 7,036,381 B2 | 5/2006 | Broden et al. | 73/708 |
| 7,040,179 B2 | 5/2006 | Drahm et al. | 73/861.356 |
| 7,058,542 B2* | 6/2006 | Hauhia et al. | 702/183 |
| 7,085,610 B2 | 8/2006 | Eryurek et al. | 700/29 |
| 7,099,852 B2 | 8/2006 | Unsworth et al. | 706/23 |
| 7,109,883 B2 | 9/2006 | Trimble et al. | 340/870.16 |
| 7,114,516 B2 | 10/2006 | Ito | 137/487.5 |
| 7,143,007 B2* | 11/2006 | Long et al. | 702/184 |
| 7,171,281 B2 | 1/2007 | Weber et al. | 700/96 |
| 7,206,646 B2* | 4/2007 | Nixon et al. | 700/83 |
| 7,254,518 B2 | 8/2007 | Eryrurek et al. | 702/183 |
| 7,258,021 B2 | 8/2007 | Broden | 73/756 |
| 7,262,693 B2* | 8/2007 | Karschnia et al. | 340/508 |
| 7,435,581 B2 | 10/2008 | West | 435/289.1 |
| 7,502,744 B2* | 3/2009 | Garrow et al. | 705/1.1 |
| 2002/0013629 A1 | 1/2002 | Nixon et al. | |
| 2002/0029808 A1 | 3/2002 | Friend et al. | 137/551 |
| 2002/0032544 A1 | 3/2002 | Reid et al. | 702/183 |
| 2002/0055790 A1* | 5/2002 | Havekost | 700/80 |
| 2002/0077711 A1* | 6/2002 | Nixon et al. | 700/51 |
| 2002/0077782 A1* | 6/2002 | Fruehling et al. | 702/185 |
| 2002/0121910 A1 | 9/2002 | Rome et al. | 324/718 |
| 2002/0130846 A1* | 9/2002 | Nixon et al. | 345/169 |
| 2002/0145568 A1 | 10/2002 | Winter | 343/701 |
| 2002/0148644 A1 | 10/2002 | Schultz et al. | 175/39 |
| 2002/0163427 A1* | 11/2002 | Eryurek et al. | 340/500 |
| 2002/0194547 A1 | 12/2002 | Christenson et al. | 714/43 |
| 2003/0014536 A1 | 1/2003 | Christensen et al. | 709/238 |
| 2003/0033040 A1 | 2/2003 | Billings | 700/97 |
| 2003/0041135 A1 | 2/2003 | Keyes et al. | 709/223 |
| 2003/0045962 A1 | 3/2003 | Eryurek et al. | |
| 2003/0083953 A1* | 5/2003 | Starkey | 705/26 |
| 2003/0158803 A1* | 8/2003 | Darken et al. | 705/36 |
| 2004/0128034 A1 | 7/2004 | Lenker et al. | 700/282 |
| 2004/0167750 A1* | 8/2004 | Pagnano et al. | 702/189 |
| 2004/0186927 A1* | 9/2004 | Eryurek et al. | 710/12 |
| 2004/0199361 A1 | 10/2004 | Lu et al. | 702/183 |
| 2004/0249583 A1 | 12/2004 | Eryurek et al. | 702/47 |
| 2005/0011278 A1 | 1/2005 | Brown et al. | 73/861.18 |
| 2005/0030185 A1 | 2/2005 | Huisenga et al. | |
| 2005/0055137 A1* | 3/2005 | Andren et al. | 700/291 |
| 2005/0072239 A1 | 4/2005 | Longsdorf et al. | 73/649 |
| 2005/0149570 A1* | 7/2005 | Sasaki et al. | 707/104.1 |
| 2005/0168343 A1* | 8/2005 | Longsdorf et al. | 340/664 |
| 2005/0284237 A1 | 12/2005 | Henry et al. | 73/861.356 |
| 2006/0075009 A1 | 4/2006 | Lenz et al. | 708/160 |
| 2006/0087402 A1* | 4/2006 | Manning et al. | 340/3.1 |
| 2006/0127183 A1* | 6/2006 | Bishop, Jr. | 405/37 |
| 2006/0229931 A1* | 10/2006 | Fligler et al. | 705/10 |
| 2006/0277000 A1 | 12/2006 | Wehrs | 702/183 |
| 2007/0010968 A1 | 1/2007 | Longsdorf et al. | 702/183 |
| 2007/0067725 A1* | 3/2007 | Cahill et al. | 715/733 |
| 2007/0079250 A1* | 4/2007 | Bump et al. | 715/762 |
| 2007/0168057 A1* | 7/2007 | Blevins et al. | 700/53 |
| 2007/0255520 A1* | 11/2007 | Becker et al. | 702/127 |
| 2007/0266020 A1* | 11/2007 | Case et al. | 707/5 |
| 2010/0138066 A1* | 6/2010 | Kong | 700/295 |
| 2010/0211443 A1* | 8/2010 | Carrel et al. | 705/14.11 |

FOREIGN PATENT DOCUMENTS

| | | | |
|---|---|---|---|
| EP | 0 122 622 A1 | 10/1984 | |
| EP | 0 413 814 A1 | 2/1991 | |
| EP | 0 487 419 A2 | 5/1992 | |
| EP | 0 512 794 A2 | 11/1992 | |
| EP | 0 594 227 A1 | 4/1994 | |
| EP | 0 624 847 A1 | 11/1994 | |
| EP | 0 644 470 A2 | 3/1995 | |
| EP | 0 825 506 A2 | 7/1997 | |
| EP | 0 827 096 A2 | 9/1997 | |
| EP | 0 838 768 A2 | 9/1997 | |
| EP | 0 807 804 A2 | 11/1997 | |
| EP | 1 058 093 A1 | 5/1999 | |
| EP | 0 965 897 A1 | 6/1999 | |
| EP | 1 022 626 A2 | 7/2000 | |
| FR | 2 302 514 | 9/1976 | |
| GB | 2 310 346 A | 8/1997 | |
| GB | 2 342 453 A | 4/2000 | |
| GB | 2 347 232 A | 8/2000 | |
| JP | 58-129316 | 8/1983 | |
| JP | 59-116811 | 7/1984 | |
| JP | 59-163520 | 9/1984 | |
| JP | 59-211196 | 11/1984 | |
| JP | 59-211896 | 11/1984 | |
| JP | 60-000507 | 1/1985 | |
| JP | 60-76619 | 5/1985 | |
| JP | 60-131495 | 7/1985 | |
| JP | 60-174915 | 9/1985 | |
| JP | 62-30915 | 2/1987 | |
| JP | 64-01914 | 1/1989 | |
| JP | 64-72699 | 3/1989 | |
| JP | 2-05105 | 1/1990 | |
| JP | 5-122768 | 5/1993 | |
| JP | 5164781 | 6/1993 | |
| JP | 06-248224 | 10/1994 | |
| JP | 08-114638 | 5/1996 | |
| JP | 8-136386 | 5/1996 | |
| JP | 8-166309 | 6/1996 | |
| JP | 8-247076 | 9/1996 | |
| JP | 9054611 | 2/1997 | |
| JP | 2712625 | 10/1997 | |
| JP | 2003503784 | 1/2003 | |
| JP | 2004021712 | 1/2004 | |
| JP | 2004034112 | 2/2004 | |
| JP | 2004-186445 | 7/2004 | |
| JP | 2007507712 | 3/2007 | |
| WO | WO 94/25933 | 11/1994 | |
| WO | WO 96/11389 | 4/1996 | |
| WO | WO 96/12993 | 5/1996 | |
| WO | WO 96/39617 | 12/1996 | |
| WO | WO 97/21157 | 6/1997 | |
| WO | WO 97/25603 | 7/1997 | |
| WO | WO 98/06024 | 2/1998 | |
| WO | WO 98/13677 | 4/1998 | |
| WO | WO 98/14855 | 4/1998 | |
| WO | WO 98/20469 | 5/1998 | |
| WO | WO 98/39718 | 9/1998 | |
| WO | WO 99/19782 | 4/1999 | |
| WO | WO 00/41050 | 7/2000 | |
| WO | WO 00/55700 | 9/2000 | |
| WO | WO 00/70531 | 11/2000 | |
| WO | WO 01/02891 A2 | 1/2001 | |
| WO | WO 01/77766 | 10/2001 | |
| WO | WO 02/27418 | 4/2002 | |
| WO | WO 2004/044666 A2 | 5/2004 | |
| WO | WO 2004/048898 A1 | 6/2004 | |
| WO | WO 2005/033639 | 4/2005 | |
| WO | WO 2007/100280 A1 * | 9/2007 | |

OTHER PUBLICATIONS

Eryurek et al., "Advanced Diagnostics Achieved with Intelligent Sensors and Fieldbus", 2001, Measurement and Control vol. 34, p. 293-311.*

Rezabek, John; "Field Device Complications", 2006, 2pg.*

Reeves-T., "Optimizing Process Equipment Performance", 2005, Emerson Process Management, 5 pages.*

PlantWeb, "Improving Availability" Emerson White Paper, 2003, 15 pages.*

PlantWeb, "Reducing Operations & Maintenance Costs", 2003, 18 pages.*

The International Search Report and Written Opinion from Application No. PCT/US2007/020502, filed Sep. 21, 2007.

First Communication from corresponding European patent application No. 07838659.6, dated Nov. 24, 2009.

U.S. Appl. No. 09/257,896, filed Feb. 25, 1999, Eryurek et al.

"Survey, Applications, and Prospects of Johnson Noise Thermom- (56) References Cited

OTHER PUBLICATIONS etry," by T. Blalock et al., *Electrical Engineering Department*, 1981 pp. 2-11.
"Noise Thermometry for Industrial and Metrological Applications at KFA Julich," by H. Brixy et al., *7th International Symposium on Temperature*, 1992.
"Johnson Noise Power Thermometer and its Application in Process Temperature Measurement," by T.V. Blalock et al., *American Institute of Physics* 1982, pp. 1249-1259.
"Field-based Architecture is Based on Open Systems, Improves Plant Performance", by P. Cleaveland, *I&CS*, Aug. 1996, pp. 73-74.
"Tuned-Circuit Dual-Mode Johnson Noise Thermometers," by R.L. Shepard et al., Apr. 1992.
"Tuned-Circuit Johnson Noise Thermometry," by Michael Roberts et al., *7th Symposium on Space Nuclear Power Systems*, Jan. 1990.
"Smart Field Devices Provide New Process Data, Increase System Flexibility," by Mark Boland, *I&CS*, Nov. 1994, pp. 45-51.
"Wavelet Analysis of Vibration, Part I: Theory$_1$," by D.E. Newland, *Journal of Vibration and Acoustics*, vol. 116, Oct. 1994, pp. 409-416.
"Wavelet Analysis of Vibration, Part 2: Wavelet Maps," by D.E. Newland, *Journal of Vibration and Acoustics*, vol. 116, Oct. 1994, pp. 417-425.
"Development of a Long-Life, High-Reliability Remotely Operated Johnson Noise Thermometer," by R.L. Shepard et al., *ISA*, 1991, pp. 77-84.
"Application of Johnson Noise Thermometry to Space Nuclear Reactors," by M.J. Roberts et al., *Presented at the 6th Symposium on Space Nuclear Power Systems*, Jan. 9-12, 1989.
"A Decade of Progress in High Temperature Johnson Noise Thermometry," by T.V. Blalock et al., *American Institute of Physics*, 1982 pp. 1219-1223.
"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.
"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.
"Detecting Blockage in Process Connections of Differential Pressure Transmitters", by E. Taya et al., *SICE*, 1995, pp. 1605-1608.
U.S. Appl. No. 10/893,144, filed Jul. 2004, Brown et al.
U.S. Appl. No. 10/675,014, filed Sep. 2003, Longsdorf et al.
U.S. Appl. No. 10/744,809, filed Dec. 2003, Brown et al.
Rezabek, John, Field Device Complications, InTech, Apr. 1, 2006, HighBeam Research online database, www.highbeam.com, 2 pages.
First Office Action from corresponding Chinese patent application No. 200780035735.6 dated Mar. 15, 2011, 4 pages.
Communication from corresponding European patent application No. 07838659.6 dated Nov. 18, 2011, 7 pages.
First Office Action from corresponding Japanese patent application No. 2009530377 dated Jun. 14, 2011.
Rejection Decision from the related Chinese patent application No. 2007800300396 dated Nov. 25, 2011, 8 pgs.
Office Action from the related Japanese patent application No. 2010519967 dated Feb. 7, 2012, 11 pgs.
Rejection Decision from the corresponding Chinese patent application No. 2007800357356 dated Mar. 28, 2012, 6 pgs.
Second Office Action from the corresponding Japanese patent application No. 2009530377 dated May 22, 2012, 5 pgs.
Summons to attend oral proceeding from the corresponding European patent application No. 07838659.6 dated Jan. 29, 2013, 6 Pages.
Decision of Rejection from corresponding European patent application No. 07838659.6 dated Jul. 3, 2013.
Decision of Reexamination dated Aug. 23, 2013 in Chinese Application No. 200780035735.6 with partial English Translation. 10 pgs, 11 pages.
Reexamination Notification dated May 3, 2013, from corresponding Chinese patent application No. 2007800357356, filed Sep. 21, 2007. 9 pgs. With English translation.
Decision of Rejection dated Apr. 30, 2013, from corresponding Japanese patent application No. 2009-530377, filed Sep. 21, 2007. 4 pgs. With English translation.

\* cited by examiner

AUTOMATIC FIELD DEVICE SERVICE ADVISER

BACKGROUND OF THE INVENTION

Field devices are used in industries to control or monitor operation of a process such as an oil refinery. A field device, such as a transmitter, is typically part of a process control or monitoring loop and is located in the field to measure and transmit a process variable such as pressure, flow or temperature, for example, to control room equipment. A field device such as a valve controller can also be part of the process control loop and controls position of a valve based upon a control signal received over the process control loop, or generated internally. Other types of controllers control electric motors or solenoids, for example. The control room equipment is also part of the process control loop such that an operator or computer in the control room is capable of monitoring the process based upon process variables received from transmitters in the field and responsively controlling the process by sending control signals to the appropriate control devices. Another field device which may be part of a process control loop is a portable communicator which is capable of monitoring and transmitting process signals on the process control loop. Typically, such devices are used to configure devices which form the process control loop.

With the advent of low-power microprocessors, field devices have undergone significant changes. Years ago, a field device would simply measure a given process variable, such as temperature, and generate an analog indication in the form of a current varying between 4 and 20 (mA) to indicate the measured temperature. Currently, many field devices employ digital communication technology as well as more sophisticated control and communication techniques. Field devices often employ low-power electronics because in many installations they are still required to run on as little as 4 mA. This design requirement prohibits the use of a number of commercially available microprocessor circuits. However, even low-power microprocessors have allowed a vast array of functions for such field devices.

One new function that is enabled by microprocessor-based smart field devices is the generation of diagnostic information. Through adaptations of hardware, software, or both, today's smart field devices are able to assess the condition of process interface elements such as sensors or solenoids, assess their own circuitry, and/or even assess the relative health of the process control loop itself. Rosemount Inc., the Assignee of the present application, has contributed in this area. See, for example, U.S. Pat. Nos. 6,047,220; 5,828,567; 5,665,899; 6,017,143; 6,119,047; 5,956,663; 6,370,448; 6,519,546; 6,594,603; 6,556,145; 6,356,191; 6,601,005; 6,397,114; 6,505,517; 6,701,274; 6,754,601; 6,434,504; 6,472,710; 6,654,697; 6,539,267; 6,611,775; 6,615,149; 6,532,292; and 6,907,383.

The result of these significant developments in the area of diagnostics for microprocessor-based smart field devices is that a wealth of information is now available relative to numerous aspects of field devices in various process installations. However, considering that a given process installation may include tens, or even hundreds of such microprocessor-based field devices, an operator or technician could easily become overwhelmed by the sheer amount of diagnostic data provided during operation.

A method of processing diagnostic data in order to better utilize the finite maintenance resources of a process installation would increase the degree to which process installations could utilize the wealth of diagnostic information available today.

SUMMARY

A field device resident algorithm receives one or more diagnostic inputs and generates actionable service information. The algorithm(s) can be changed or updated after the manufacture of the field device. The actionable service information can be displayed locally or sent over a process control loop. A prediction engine can be employed to determine a period within which such service should be completed.

DETAILED DESCRIPTION

Process variables are typically the primary variables which are being controlled or monitored in a process. As used herein, process variable means any variable which describes the condition of the process such as, for example, pressure, flow, temperature, product level, pH, turbidity, vibration, position, motor current or any other characteristic of the process. A diagnostic signal, as used herein, includes information related to operation of devices and elements in the process control loop or even the process itself. For example, diagnostic signals can include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current, loop related parameters (such as control loop resistance, voltage, or current), or any other parameter which may be detected or measured in the system.

Figure 1:
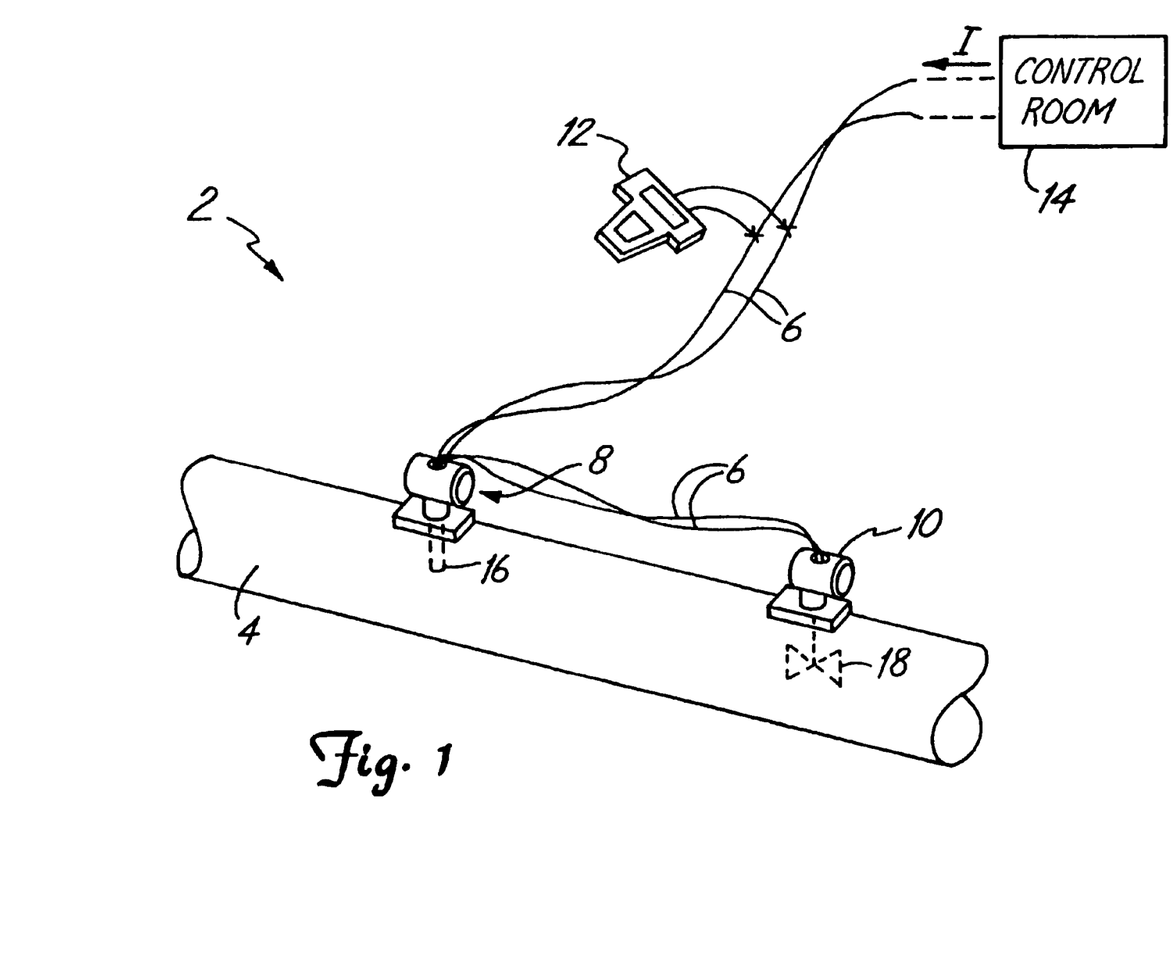
FIG. 1 is a simplified diagram showing a process control loop including a transmitter, controller, hand-held communicator and control room.

FIG. 1 is a diagram showing an example of a process control system 2 which includes process piping 4 which carries a process fluid and two wire process control loop 6 carrying loop current I. A transmitter 8, controller 10, which couples to a final control element in the loop such as an actuator, valve, a pump, motor or solenoid, communicator 12, and control room 14 are all part of process control loop 6. It is understood that loop 6 is shown in one configuration and any appropriate process control loop may be used such as a 4-20 mA loop, 2, 3 or 4 wire loop, multi-drop loop and a loop operating in accordance with the HART®, Fieldbus or other digital or analog communication protocol. Alternatively, the process control loop may employ various wireless communication techniques. In operation, transmitter 8 senses a process variable such as flow using sensor 16 and transmits the sensed process variable over loop 6. The process variable may be received by controller/valve actuator 10, communicator 12 and/or control room equipment 14. Controller 10 is shown coupled to valve 18 and is capable of controlling the process by adjusting valve 18 thereby changing the flow in pipe 4. Controller 10 receives a control input over loop 6 from, for example, control room 14, transmitter 8 or communicator 12 and responsively adjusts valve 18. In another embodiment, controller 10 internally generates the control signal based upon process signals received over loop 6. Communicator 12 may be the portable communicator shown in FIG. 1 or may be a permanently mounted process unit which monitors the process and performs computations. Field devices include, for example, transmitter 8 (such as a 3051S transmitter available from Rosemount Inc.), controller 10, communicator 12 and control room 14 shown in FIG. 1. Any of field devices 8, 10, 12 or 14 shown in FIG. 1 may include enhanced diagnostic signal processing in accordance with embodiments of the present invention.

Figure 2:
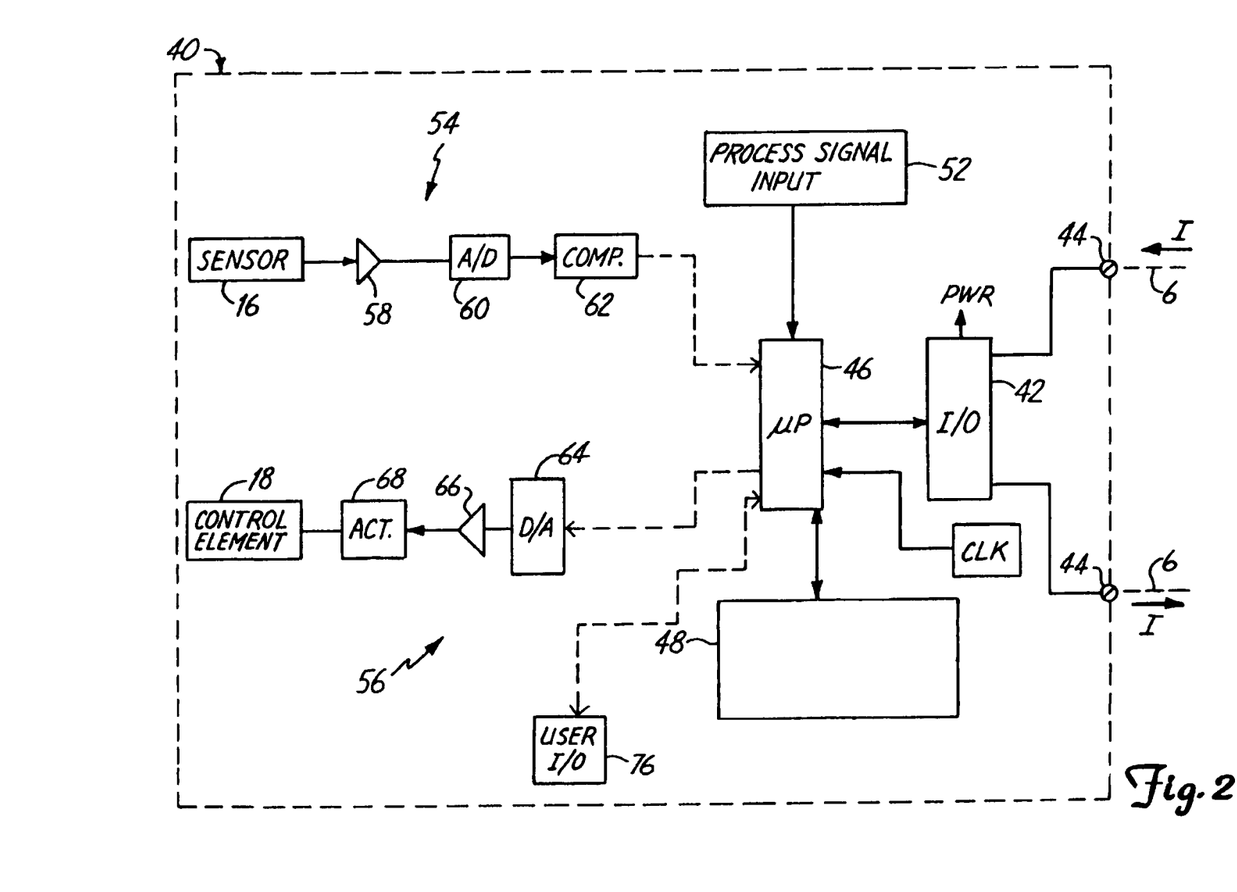
FIG. 2 is a block diagram of a field device with which embodiments of the present invention can be practiced.

FIG. 2 is a block diagram of one example of a field device 40 forming part of loop 6. Device 40 is shown generically and may comprise any field device such as transmitter 8, controller 10, or communicator 12. Control room equipment 14 may comprise, for example, a DCS system implemented with a PLC and controller 10 may also comprise a "smart" motor and pump. Field device 40 includes I/O circuitry 42 coupled to loop 6 at terminals 44. I/O circuitry has preselected input and output impedance known in the art to facilitate appropriate communication from and to device 40. Device 40 includes microprocessor 46, coupled to I/O circuitry 42, memory 48 coupled to microprocessor 46 and clock 50 coupled to microprocessor 46. Microprocessor 46 receives a process signal input 52. Block input is intended to signify input of any process signal such as a process variable, or a control signal and may be received from loop 6 using I/O circuitry 42 or may be generated internally within field device 40. Field device 40 is shown with a sensor input channel 54 and a control channel 56. Typically, a transmitter such as transmitter 8 will exclusively include sensor input channel 54 while a controller such as controller 10 will exclusively include a control channel 56. Other devices on loop 6 such as communicator 12 and control room equipment 14 may not include channels 54 and 56. It is understood that field device 40 may contain a plurality of channels to monitor a plurality of process variables and/or control a plurality of control elements as appropriate.

Sensor input 54 includes sensor 16, sensing a process variable and providing a sensor output to amplifier 58 which has an output which is digitized by analog to digital converter 60. Input 54 is typically used in transmitters such as transmitter 8. Compensation circuitry 62 compensates the digitized signal and provides a digitized process variable signal to microprocessor 46. In one embodiment, input 54 comprises a diagnostic channel which receives a diagnostic signal.

When field device 40 operates as a controller such as controller 8, device 40 includes control channel 56 having control element 18 such as a valve, for example. Control element 18 is coupled to microprocessor 46 through digital to analog converter 64, amplifier 66 and actuator 68. Digital to analog converter 64 digitizes a command output from microprocessor 46 which is amplified by amplifier 66. Actuator 68 controls the control element 18 based upon the output from amplifier 66. In one embodiment, actuator 68 is coupled directly to loop 6 and controls a source of pressurized gas (not shown) to position control element 18 in response to the current I flowing through loop 6. In one embodiment, controller 10 includes control channel 56 to control a control element and also includes sensor input channel 54 which provides a diagnostic signal such as valve stem position, force, torque, actuator pressure, pressure of a source of pressurized air, etc.

In one embodiment, I/O circuitry 42 provides a power output used to completely power other circuitry in process device 40 using power received from loop 6. Typically, field devices such as transmitter 8, or controller 10 are powered off the loop 6 while communicator 12 or control room 14 has a separate power source. As described above, process signal input 52 provides a process signal to microprocessor 46. The process signal may be a process variable from sensor 16, the control output provided to control element 18, a diagnostic signal sensed by sensor 16, or a control signal, process variable or diagnostic signal received over loop 6, or a process signal received or generated by some other means such as another I/O channel.

A user I/O circuit 76 is also connected to microprocessor 46 and provides communication between device 40 and a user. Typically, user I/O circuit 76 includes a display and audio for output and a keypad for input. Typically, communicator 12 and control room 14 includes I/O circuit 76 which allows a user to monitor and input process signals such as process variables, control signals (setpoints, calibration values, alarms, alarm conditions, etc.) along with rules, sensitivity parameters and trained values. A user may also use circuit 76 in communicator 12 or control room 14 to send and receive such process signals to transmitter 8 and controller 10 over loop 6. Further, such circuitry could be directly implemented in transmitter 8, controller 10 or any other process device 40.

Microprocessor 46 acts in accordance with instructions stored in memory 48. Various instructions stored within memory 48 allow microprocessor 46 to execute one or more algorithms within the field device in accordance with embodiments of the present invention. In general, the algorithms allow the field device to obtain one or more diagnostic inputs and generate a service-related recommendation output. Diagnostic information useful as input to the algorithm(s) can include any diagnostic information that has been currently developed, or will be developed. In contrast to types of diagnostic output that have been provided in the past, the field device service advisor recommends a particular service to be performed relative to the field device, components connected to the field device, to other field devices, or to the process control loop itself.

As can be imagined, if the tens or hundreds of field devices in a given process installation were providing various types of diagnostic information over process control loops, it could inundate an operator with such a vast amount of information that he or she may not be able to adequately determine what type or quantity of corrective action should be instituted with respect to a give piece or pattern of diagnostic information. Moreover, the sheer volume of diagnostic information itself could consume valuable communication bandwidth on the process control loop thereby reducing, or degrading the ability for process variable information to be communicated timely and effectively. Embodiments of the present invention preferably include a field device-resident algorithm that is able to take one or more inputs, including diagnostic inputs, and provide a service action recommendation. In this way, the field devices themselves can make a number of decisions about what types, quantity and timing of corrective service actions should be taken. Then, this singular message can be displayed by the field device, or communicated to a control room.

Figure 3:
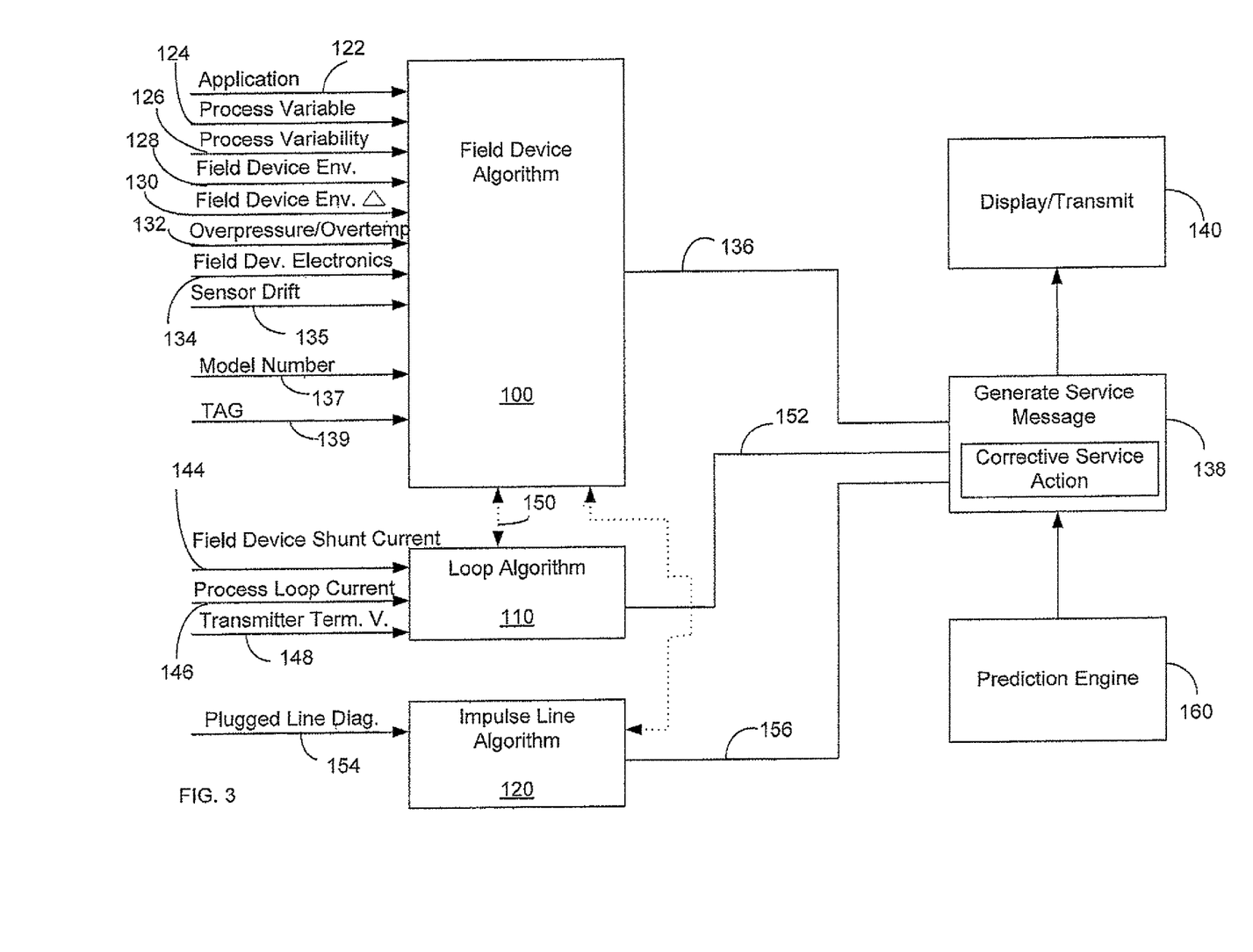
FIG. 3 is a block diagram illustrating a number of algorithmic blocks in accordance with embodiments of the present invention.

FIG. 3 is a diagrammatic view of various service adviser algorithms in accordance with embodiments of the present invention. Preferably, each of algorithms 100, 110 and 120 are used by microprocessor 46 executing suitable instructions stored within memory 48. While algorithms 100, 110 and 120 are illustrated and described separately, such illustration is for clarity, and, in fact, all or any algorithms could be combined, as appropriate.

Field device algorithm 100 takes any suitable inputs related to the field device itself. Examples of suitable inputs include, but are not limited to, application input 122 (such as flow, level or pressure); process variable input 124; process variability input 126; field device environmental input 128; field device environmental change input 130; overpressure/overtemp input 132; field device electronics input 134; sensor drift 135; field device model number input 137 and field device tag input 139.

An example of process variable input 124 generally includes the value, either currently or historically, or both of the process variable of the field device. For example, if the field device is a pressure transmitter, then process variable 124 could be the actual process pressure value, history of values or any combination thereof.

Process variability input 126 is generally an indication of the variability of the process variable over a specified period. For example, process variability input may be a standard deviation calculation on an historical range of process variable values, or simply the difference between a local minima and local maxima of the process variable observed within a specified period of time.

Field device environmental input 128 includes any suitable parameter that may bear upon the operation of the field device itself. Examples of such parameters include the temperature of the field device itself, as measured by an internal temperature sensor, the relative humidity proximate the exterior of the field device, radio frequency interference that may be measured or detected by the field device, or any other external influences to the field device that can be measured, and that can bear upon the field device operation.

Input 130 is preferably based upon a mathematical operation on a history of values provided by input 128. For example, if input 128 includes a measurement of the temperature of the field device itself, input 130 can simply be an indication of whether the temperature of the field device is changed by a specific amount within a specific time.

Input 132 is preferably a measure of whether a field device is exposed to any relative extremes of the process variable. For example, if the field device is a pressure transmitter, input 132 is an indication of whether the pressure transmitter was subjected to an overpressure event, and if so, the duration and number of such overpressure events.

Input 134 can be generated by diagnostics run on or by the field device electronics itself. While not specifically illustrated, field device algorithm 100 can include other suitable diagnostic inputs relative to the field device. Moreover, as the state of field device diagnostics advances, it is contemplated that other types of field device diagnostic information could be provided to algorithm 100.

An example of sensor drift 135 includes an indication that the sensor, when subjected to a known characteristic, such as temperature for a temperature sensor, exhibits a reading that has changed over time. Sensor drift can occur as a sensor begins to wear, and some level of drift may be acceptable, while still indicating that service should be performed.

An example of field device model number input 137 includes data that is provided to algorithm 100 relative to the model number of the field device itself. Many field device manufacturers provide model numbers that may be parsed, at least to some degree, to provide a description of the field device. For example, a particular model code may describe the material of construction of the field device, the range of the field device, as well as any performance enhancements present in the field device. Thus, algorithm 100 may take such information into account during processing and modify the service message accordingly.

An example of field device tag input 139 is any data provided to algorithm 100 by a user, either locally or through remote means, that is an indication of a type of service performed by the field device. For example, pressure and differential pressure transmitters measure pressure, flow or level. The tagging convention may call for pressure applications to be tagged "PT", for example PT-101. Flow application may be tagged "FT" and level applications tagged "LT."

Field device algorithm 100 generally takes one or more of inputs 122, 124, 126, 128, 130, 132, 134, 135, 137 and 139, and processes such inputs to generate actionable information regarding service on line 136. The specifics of algorithm 100 can be developed via empirical means through controlled testing, and/or can include specific rules relative to conditions of one or more inputs that generate actionable information regarding service. For example, testing may show that a combination of high process variability 126 and high sensor temperature requires service in the form of "inline zero of the field device every X hours." This actionable service information can then be reported along line 136 to block 138 which may simply display or transmit the service information at block 140.

Loop algorithm 110 takes as inputs field device shunt current diagnostic 144; process loop current diagnostic input 146; field device terminal voltage 148; and potentially any output provided by field device algorithm 100, as illustrated in phantom at line 150.

An example of field device shunt current diagnostics 144 includes a measurement of the current consumed by field device 144 in its normal operations.

An example of process loop current diagnostics input 146 includes measurement of current able to be provided over the process communication loop to which the field device is connected.

An example of field device terminal voltage diagnostic input 148 includes measurement of the voltage across the field device terminals where the field device couples to the process communication loop.

As illustrated by the bi-directional arrows on phantom line 150, loop algorithm 110 may provide an output that is input to field device algorithm 100. Loop algorithm 110 takes one or more inputs 144, 146, 148 and 150, and generates actionable information regarding service of the loop along line 152.

Impulse line algorithm 120 generally receives plugged line diagnostic 154 but may receive any other information that may reasonably indicate a plugged impulse line condition. Impulse lines are conduits that convey pressure from an isolator diaphragm to a pressure sensor module. If such lines become plugged, or otherwise damaged, their ability to convey pressure from the isolation diaphragm to the sensor module may also become diminished. The ability to detect this condition is important. As illustrated in FIG. 3, impulse line algorithm line 120 may take an input from, or provide an output to, any of field device algorithm 100 and loop algorithm 110. Impulse line algorithm 120 provides actionable information regarding service of the impulse lines along line 156.

Examples of actionable service information provided by algorithms 100, 110 or 120 include: in-line zero field devices; blow down impulse lines; shop calibrate; check wiring/power supply; clear impulse lines; shop/factory calibrate; check capillary system; or any other suitable user-defined action that may be provided by the algorithms.

In accordance with an embodiment of the present invention, the algorithms themselves can be modified or updated as appropriate. Accordingly, as new relationships between field device diagnostic information and actionable service recommendations are correlated, such new correlations between the inputs and the actionable service outputs can be updated to the field devices. These updates can take numerous forms. The local ROM of the field device may be exchanged; updated file information may be transmitted to the field device over the process control loop; or a secondary communication interface, such as a wireless communication link with a field maintenance device.

Each of lines 136, 152 and 156 provides service information to module 138. Module 138 may combine the information into a signal message, and/or may engage predication engine 160 to determine when such actionable service information should be effected. For example, if field device algorithm 100 provides an indication that a particular field device service action is required, prediction engine 160 may be consulted to provide a time period within which such action should be effected.

Additionally, or in the alternative, module 138 may combine, or otherwise process, the information output over one or more of lines 136, 152 and 156 to generate an overall "health" indication or metric. This overall health indication can be displayed locally at the device, communicated over the process control loop, and/or used in conjunction with prediction engine 160 to calculate a point in the future when the health indication will reach a threshold beyond which corrective action is necessary.

Prediction engine 160 can include or utilize any known algorithmic and/or mathematical techniques to predict, based on historical data, programmatic data, empirical data, or any combination thereof, when a particular service action should be required. Examples of known techniques which can be employed in or by prediction engine 160 include the use of polynomial curve fits, neural networks, threshold circuitry, and/or fuzzy logic. Further detail regarding these techniques may be found in U.S. Pat. No. 6,701,274.

The polynomial curve fit technique employs empirical models or polynomial curve fitting in microprocessor 46. A polynomial-like equation which has a combination of any suitable input signals as the variable terms in the polynomial, together with constants stored in memory 48 can be used for computing a future time period within which a particular service action should be effected. If field device memory 48 is limited, the constants and/or equation may be sent over process communication loop 6.

Neural networks provide another useful technique for prediction engine 160. In particular, the neural network can be implemented with a multi-layer neural network. Although a number of training algorithms can be used to develop a neural network model for different goals, one embodiment includes using the known back propagation network (BPN) to develop neural network modules which will capture the non-linear relationship among a set of inputs and outputs. The number of inputs to the neural network may differ depending on the complexity of the system, and any one or combination of multiple inputs can be used.

Threshold circuitry can also be used to provide important functions for prediction engine 160. In particular, microprocessor 46 may consult with, or include such threshold circuitry. Rules resident within, or executed by microprocessor 46 may be implemented in either digital or analog circuitry. For example, the following is a sample if-then rule for spikes in pressure sensor output from a pressure sensor: if the number of spikes detected since commissioning multiplied by a value in memory 48 is greater than an upper threshold, then indicate that the pressure sensor must be replaced within X days. This is merely one illustrative example of threshold circuitry being used in conjunction with if-then rules to facilitate prediction engine 160.

Fuzzy logic is yet another technique that can be employed for prediction engine 160. In particular, using fuzzy logic, input data can be processed as a function of a membership function which is selected based upon a value of the input data. Such fuzzy logic techniques are well suited for inputs which fall in a non-linear or non-binary fashion.

Using prediction engine 160, the field device can generate actionable service information augmented with an interval within which the service action should be completed. Specifically, service notifications, such as blow down impulse line can be augmented to, "blow down impulse line within X hours." These services notifications generally take the form of take "X" action within "Y" time. The time attribute can recite a specific incremental time in the future, such as "within six hours" can recite an interval such as "daily" or can recite a specific time in the future. It is also preferred that each field device be shipped with default settings in memory 48 such that the service adviser algorithm will generate an initial startup recommendation action such as "factory calibrate unit in 60 months."

As the field device gains successful runtime, it is also contemplated that the prediction algorithm can be automatically modified such that the successful runtime is taken into account. Thus, a given field device that notes a diagnostic input that has a recommended service action may not recommend the service action as urgently if the field device has run successfully for ten years, in comparison to field device that is just starting its field operation.

Figure 4:
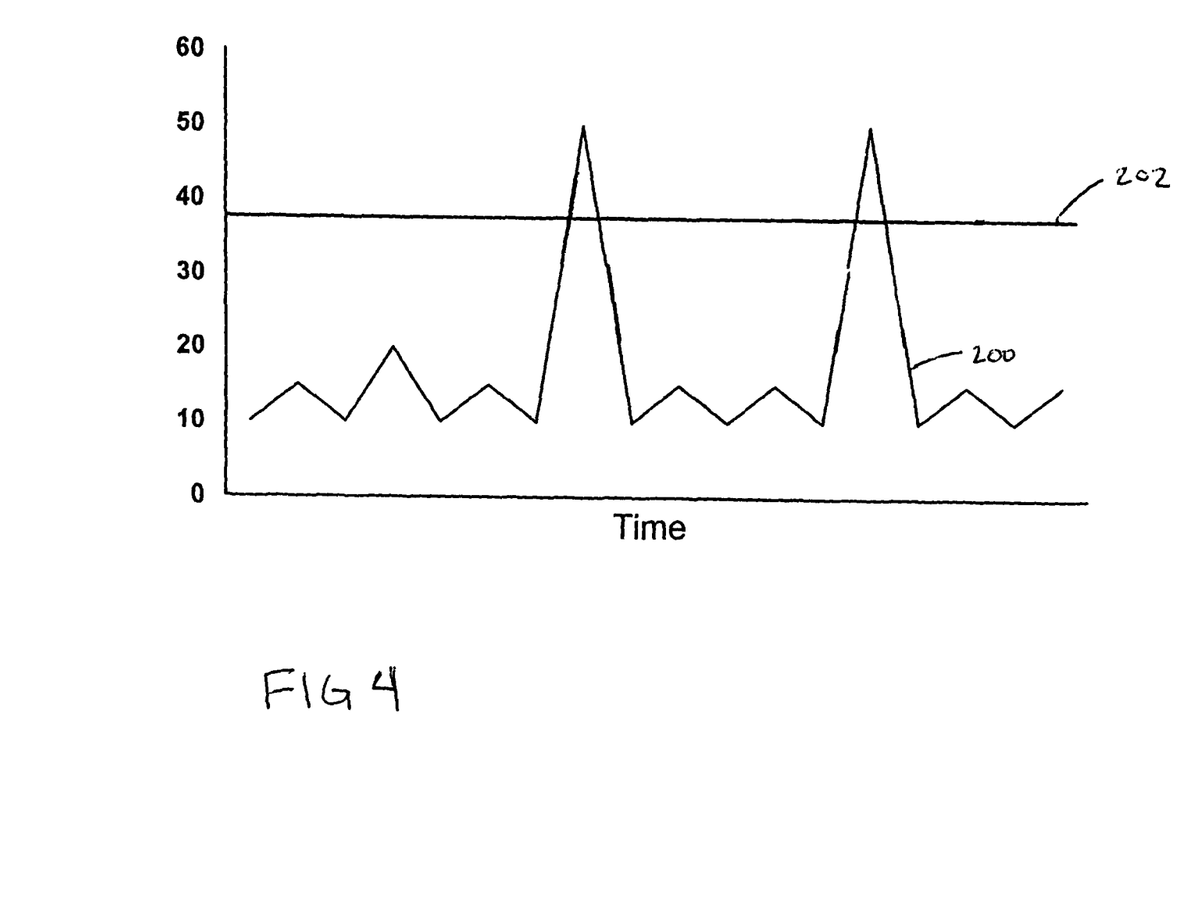
FIG. 4 is a chart illustrating variation in a health indication over time, in accordance with an embodiment of the present invention.

FIG. 4 is a chart illustrating variation in a health indication over time, in accordance with an embodiment of the present invention. Health indication 200 is compared with index 202 to determine whether the overall health necessitates corrective action. Index 202 can be established in any suitable manner, but is preferably established using High Accelerated Life Testing (HALT) with an index related thereto stored in each field device. As illustrated in FIG. 4, the health indication experiences two excursions beyond index 202. Such excursions may be caused by any of a variety of variables, or combinations thereof. Each field device preferably includes rules that cause the field device to report degradation if any such excursions are experienced, or the field device may report degradation after a set number or duration of excursions have occurred.

Figure 5:
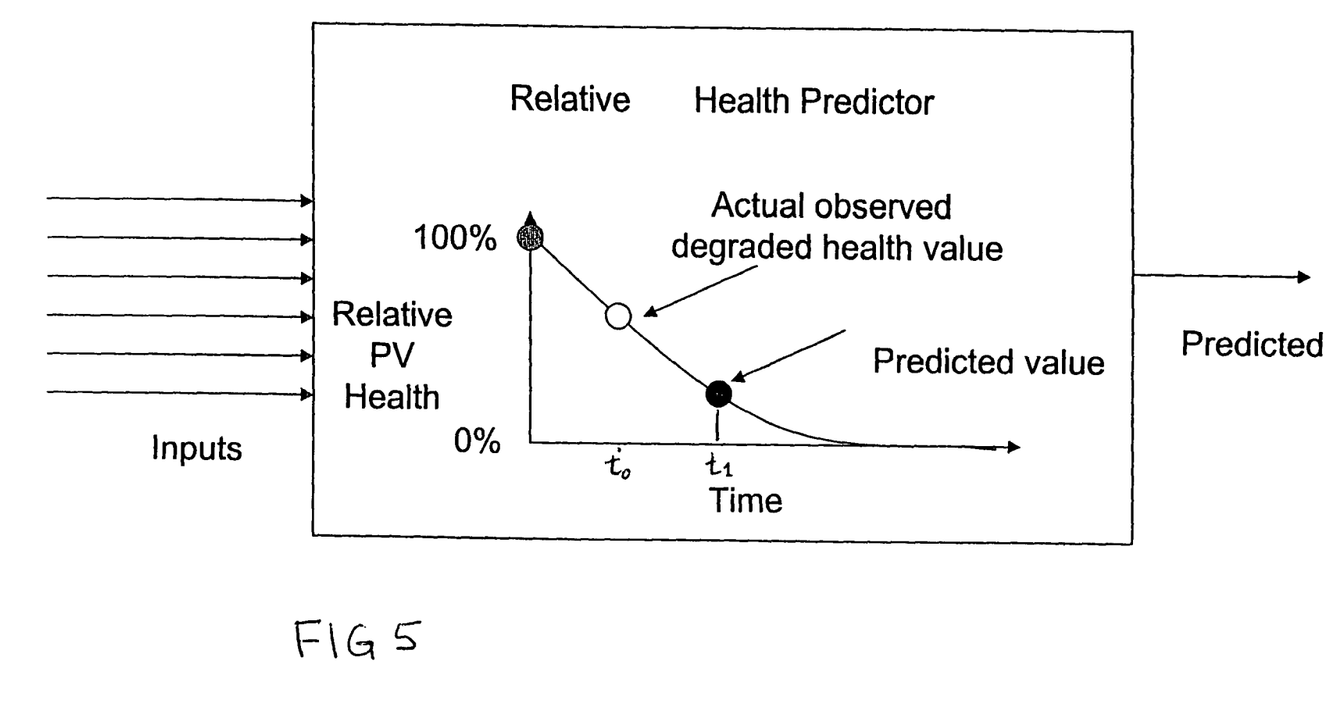
FIG. 5 is an illustrative chart showing how a health indication can be predicted along a degradation curve.

FIG. 5 is an illustrative chart showing how health indication 200 can be predicted along a degradation curve. Thus, an actual health indication observed at time to can be used to calculate that the health indication will reach a certain level at time $t_1$. Thus, the actionable service information can include a time in the future when one or more actions should be performed. By calculating the degradation slope, even a first order mathematical model can be used to predict when the health indication will reach a certain threshold. Prediction engine 160 can use any suitable technique, or combination of techniques listed above, implemented in software, hardware, or any combination thereof.

Embodiments of the present invention generally provide a number of advantages in the field of diagnostics for smart microprocessor-based field devices. Embodiments generally provide a user with actionable information regarding service versus ambiguous raw alarm data. Further, users are provided with predictive information so that action may be taken before the process variable information is too bad to use for control. Further still, the various algorithms can be developed and refined empirically via a control test program. Further still, the algorithm is preferably resident in field device memory which reduces host dependency. Finally, the recommended maintenance action can be reported in any suitable manner, including via enhanced Electronic Device Description Language (EDDL) technology.

Although the present invention has been described with reference to preferred embodiments, workers skilled in the art will recognize that changes may be made in form and detail without departing from the spirit and scope of the invention.

What is claimed is:

1. A field device comprising a process variable transmitter, comprising:
   a process variable sensor configured to sense a process variable of an industrial process;
   a microprocessor;
   a memory operably coupled to the microprocessor;
   a plurality of diagnostic inputs operably coupled to the microprocessor;
   wherein the microprocessor implements field device resident algorithms based upon instructions stored in the memory including:
      a plurality of diagnostic algorithms based upon the plurality of diagnostic inputs, wherein the plurality of diagnostic algorithms provide a service information output indicative of actionable service information comprising a corrective service action which should be performed based upon the plurality of diagnostic inputs;
      a prediction engine implemented by a prediction algorithm configured to determine a service interval within which the corrective service action should be performed, the service interval based upon a health indication degradation curve used to predict when a health indication will reach a threshold level and wherein the prediction algorithm is modified based upon successful runtime of the process variable transmitter;
      a service message module configured to generate a service message based upon the service interval and the corrective service action; and
   I/O circuitry configured to transmit information related to the sensed process variable and further configured to transmit the service message including the corrective service action and an augmented service interval to another location.

2. The field device of claim 1, including a local display coupled to the microprocessor which displays the service message including the corrective service action and wherein the corrective service action is related to at least one of the field device itself, a component coupled to the field device, a second field device, and a process control loop.

3. The field device of claim 1, wherein the at least one of the diagnostic inputs includes a field device diagnostic input.

4. The field device of claim 2, wherein the at least one of the diagnostic inputs includes application information.

5. The field device of claim 2, wherein the at least one of the diagnostic inputs includes a process variable.

6. The field device of claim 2, wherein the at least one of the diagnostic inputs includes process variability.

7. The field device of claim 2, wherein the at least one of the diagnostic inputs includes a characteristic of an environment of the field device.

8. The field device of claim 1, wherein the at least one of the diagnostic inputs also includes relative changes in an environment of the field device.

9. The field device of claim 2, wherein the at least one of the diagnostic inputs includes an indication of exposure of the field device to extremes in process variables.

10. The field device of claim 2, wherein the at least one of the diagnostic inputs includes a diagnostic of electronics of the field device.

11. The field device of claim 2, wherein the at least one of the diagnostic inputs includes sensor drift.

12. The field device of claim 1, wherein the at least one of the diagnostic inputs includes a loop diagnostic input.

13. The field device of claim 12, wherein the at least one of the diagnostic inputs includes field device shunt current.

14. The field device of claim 12, wherein the at least one of the diagnostic inputs includes process loop current.

15. The field device of claim 12, wherein the at least one of the diagnostic inputs includes field device terminal voltage.

16. The field device of claim 1, wherein the at least one of the service-related recommendation output is transmitted over a process control loop.

17. The field device of claim 16, wherein the at least one service-related recommendation output is transmitted using enhanced Electronic Device Description Language technology.

18. The field device of claim 1, wherein one of the plurality of diagnostic algorithms comprises a field device diagnostic algorithm.

19. The field device of claim 1, wherein one of the plurality of diagnostic algorithms comprises a loop diagnostic algorithm.

20. The field device of claim 1, wherein one of the plurality of diagnostic algorithms comprises an impulse line diagnostic algorithm.

21. The field device of claim 1, wherein the prediction algorithm is implemented using a polynomial curve fit.

22. The field device of claim 1, wherein the prediction algorithm is implemented using a neural network.

23. The field device of claim 1, wherein the prediction algorithm is implemented using rules.

24. The field device of claim 1, wherein the prediction algorithm is implemented using fuzzy logic.

25. The field device of claim 1, wherein the health indication degradation curve is implemented using a mathematical model.

* * * * *